United States Patent
Mareau et al.

(10) Patent No.: US 11,305,346 B2
(45) Date of Patent: Apr. 19, 2022

(54) POPPET VALVE AND METHOD OF ITS MANUFACTURE

(71) Applicant: FEDERAL-MOGUL VALVETRAIN GMBH, Barsinghausen (DE)

(72) Inventors: Andre Mareau, Strasbourg (FR); Stefan Kellermann, Barsinghausen (DE); Antonius Wolking, Barsinghausen (DE); Oliver Schulze, Donaueschingen (DE); Andreas Heinek, Bannewitz (DE); Guido Bayard, Dortmund (DE); Daniel Eisenring, Blumberg (DE); Olaf Josef, Gehrden (DE); Carsten Struebbe, Gladbeck (DE); Wolf-Dieter Streich, Blumberg (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 115 days.

(21) Appl. No.: 16/608,294

(22) PCT Filed: Apr. 27, 2017

(86) PCT No.: PCT/EP2017/060050
§ 371 (c)(1),
(2) Date: Oct. 25, 2019

(87) PCT Pub. No.: WO2018/196977
PCT Pub. Date: Nov. 1, 2018

(65) Prior Publication Data
US 2020/0094323 A1 Mar. 26, 2020

(51) Int. Cl.
*B22F 3/15* (2006.01)
*F01L 3/20* (2006.01)
(Continued)

(52) U.S. Cl.
CPC .......... *B22F 3/156* (2013.01); *F01L 3/20* (2013.01); *F16K 3/246* (2013.01); *B22F 2003/145* (2013.01); *F01L 2303/01* (2020.05)

(58) Field of Classification Search
CPC .......... B22F 3/156; B22F 2003/145; B22F 2998/10; B22F 5/008; B22F 3/225;
(Continued)

(56) References Cited

U.S. PATENT DOCUMENTS 2,280,686 A * 4/1942 Colwell ............... B21H 7/182
29/888.4
4,852,531 A * 8/1989 Abkowitz ............ F01L 3/02
123/188.3
(Continued)

FOREIGN PATENT DOCUMENTS

EP 1482156 A2 12/2004
EP 10925682 A1 5/2008

OTHER PUBLICATIONS

Edwards ("All About Engine Valves".Thomasnet. 2021) (Year: 2021).*
(Continued)

*Primary Examiner* — Anthony J Zimmer
*Assistant Examiner* — Ricardo D Morales
(74) *Attorney, Agent, or Firm* — Robert L. Stearns; Dickinson Wright, PLLC

(57) ABSTRACT

A method for manufacturing a poppet valve or mushroom valve includes providing a mixture of metal powder and a binder, filling and pressing said mixture in a mold, to obtain a green product, removing the binder from the green product, and thermally sintering the green product to a poppet valve blank, by hot isostatic pressing. A poppet valve is also provided that is manufactured with this method.

16 Claims, 6 Drawing Sheets

(51) Int. Cl.
*F16K 3/24* (2006.01)
*B22F 3/14* (2006.01)

(58) Field of Classification Search
CPC ..... F01L 3/20; F01L 2303/01; F01L 2303/00; F01L 3/18; F01L 3/22; F01L 3/00; F16K 3/246; F04B 53/129
See application file for complete search history.

(56) References Cited

U.S. PATENT DOCUMENTS

| | | | |
|---|---|---|---|
| 7,296,594 B1 | 11/2007 | Phanco | |
| 9,950,370 B2* | 4/2018 | Roth-Fagaraseanu | ...................... B22F 5/009 |
| 2002/0195741 A1* | 12/2002 | Jessberger | ............ B29C 33/304 264/221 |
| 2008/0092383 A1* | 4/2008 | Aust | ......................... F01L 3/20 29/888.4 |
| 2012/0136400 A1* | 5/2012 | Julien | ...................... A61F 2/28 606/86 R |
| 2013/0218281 A1* | 8/2013 | Broadley | ................ B22F 7/062 623/18.11 |
| 2016/0326919 A1 | 11/2016 | Ikemi | |

OTHER PUBLICATIONS

Osada et al. ("Nitriding Response of Microminiature Powder Injection Molded Titanium." International Journal of Powder Metallurgy 46.2 (2010).) (Year: 2010).*

* cited by examiner

Binder

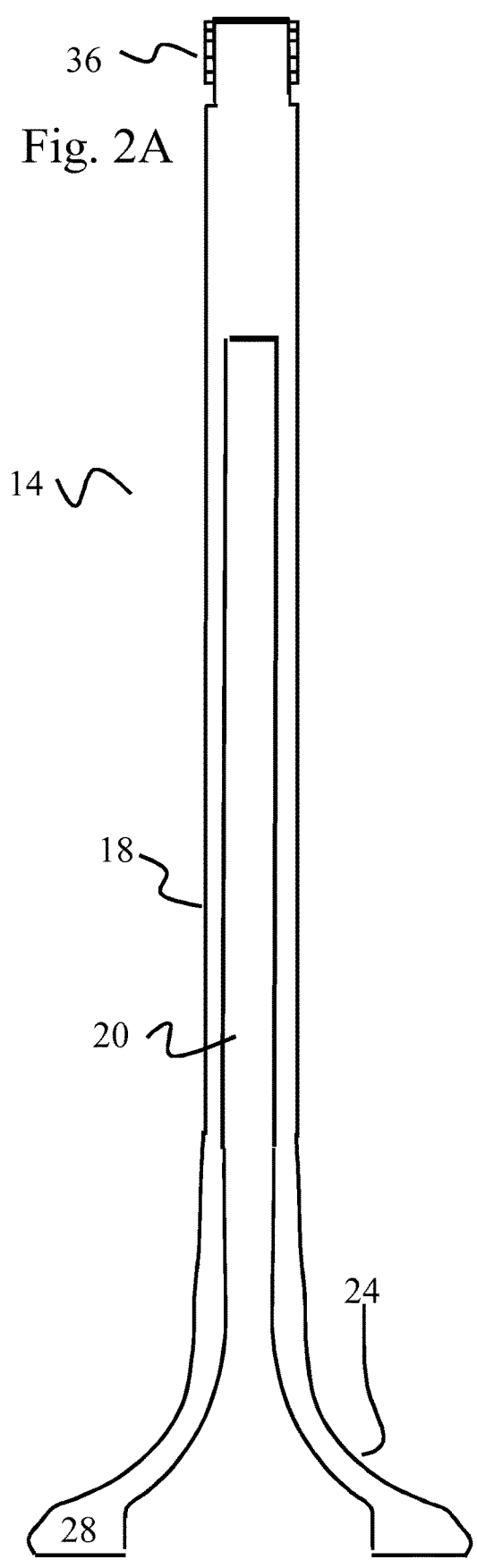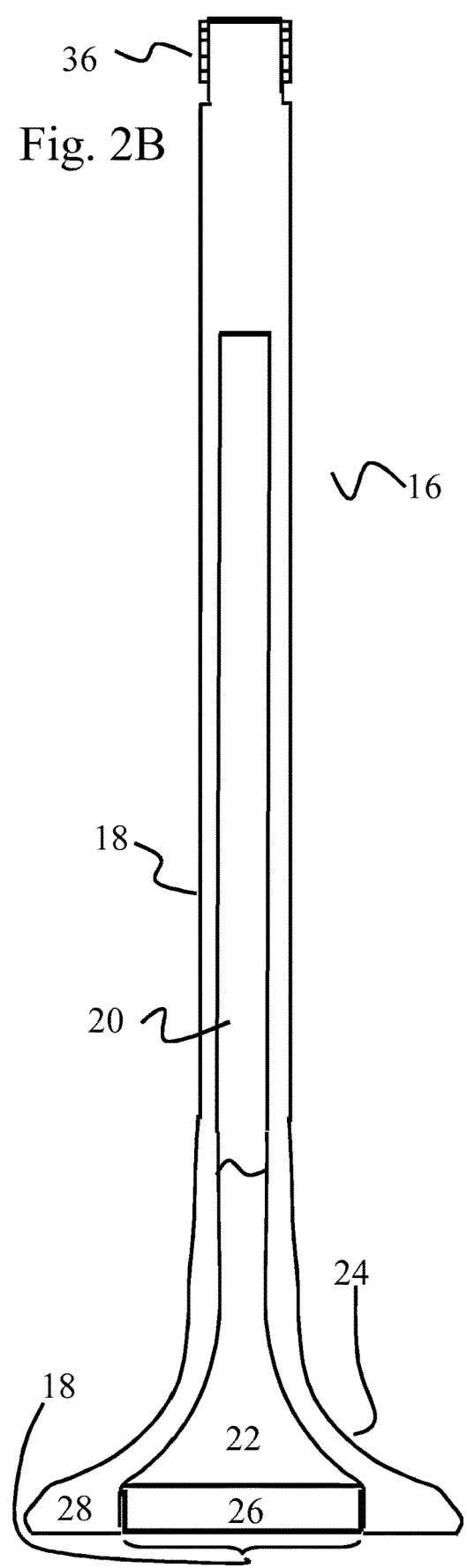

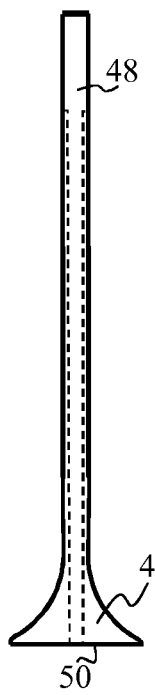
Fig.4A
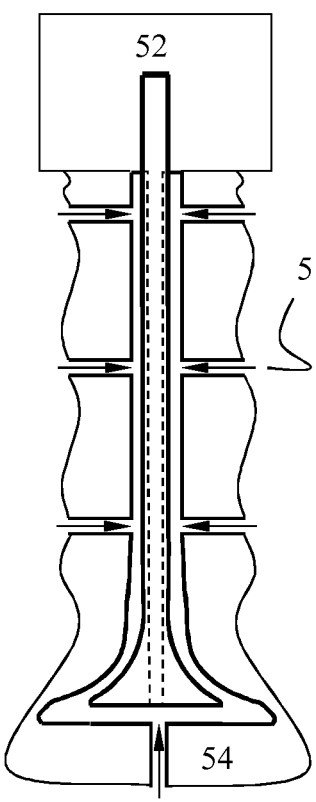
Fig.4B
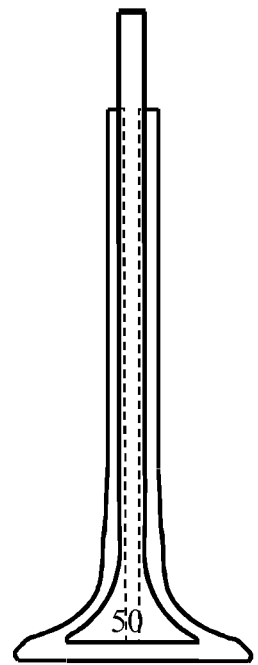
Fig.4C
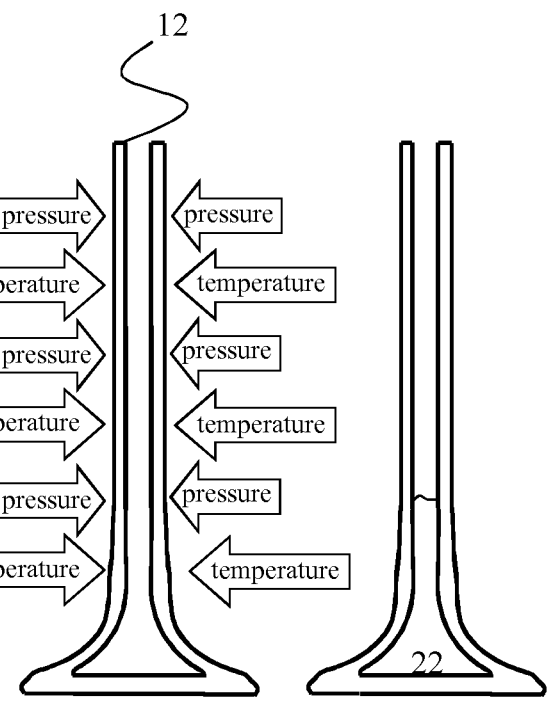
Fig.4D
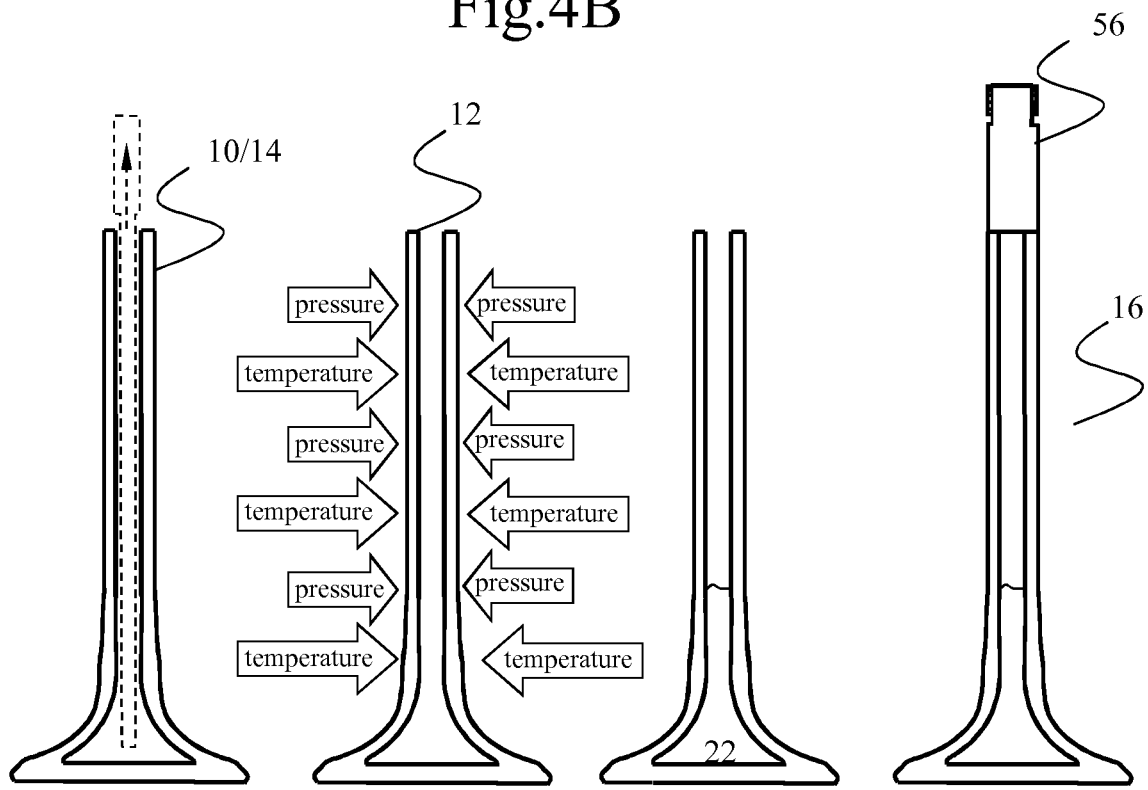
Fig.4E
Fig.4F
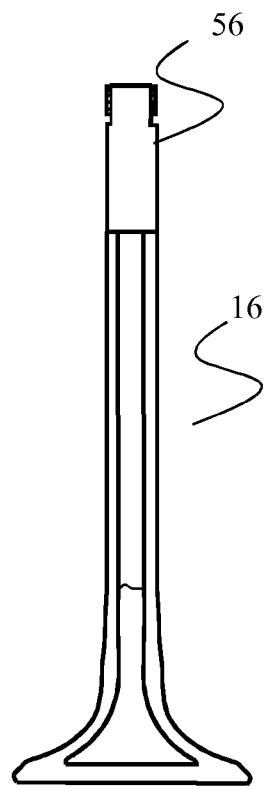
Fig.4G

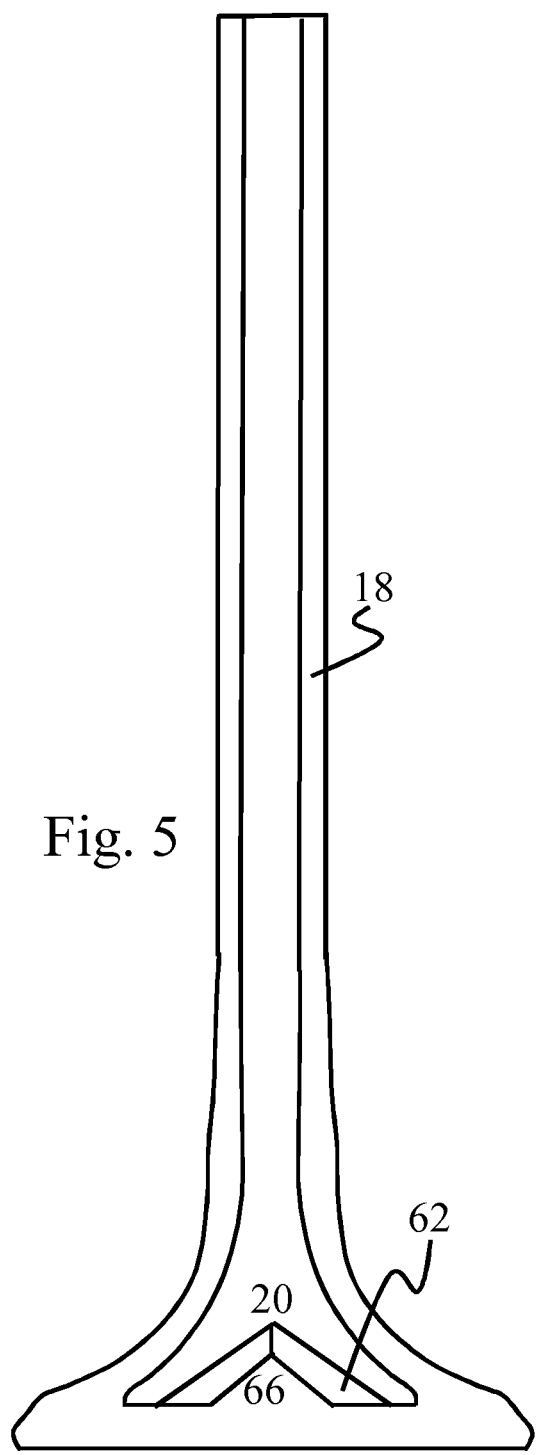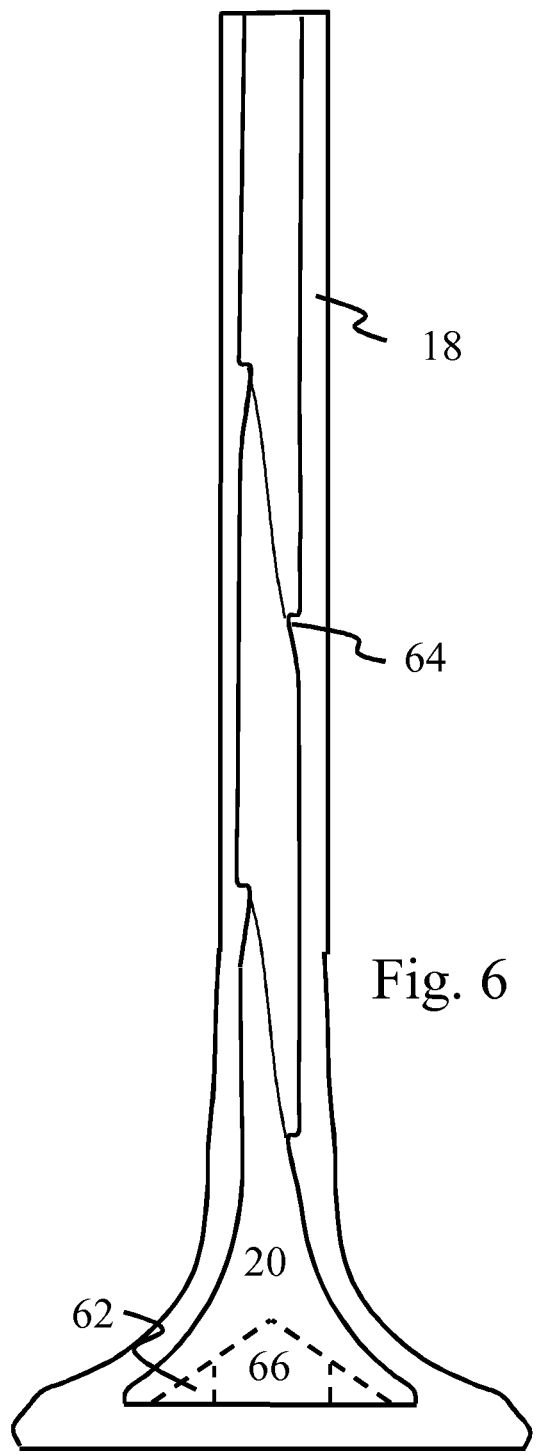

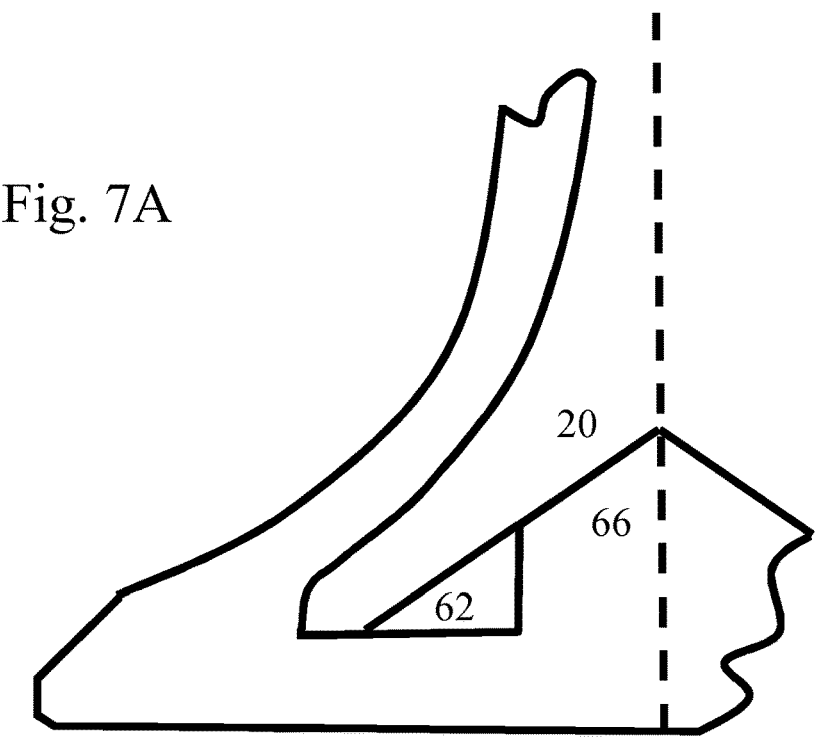
Fig. 7A
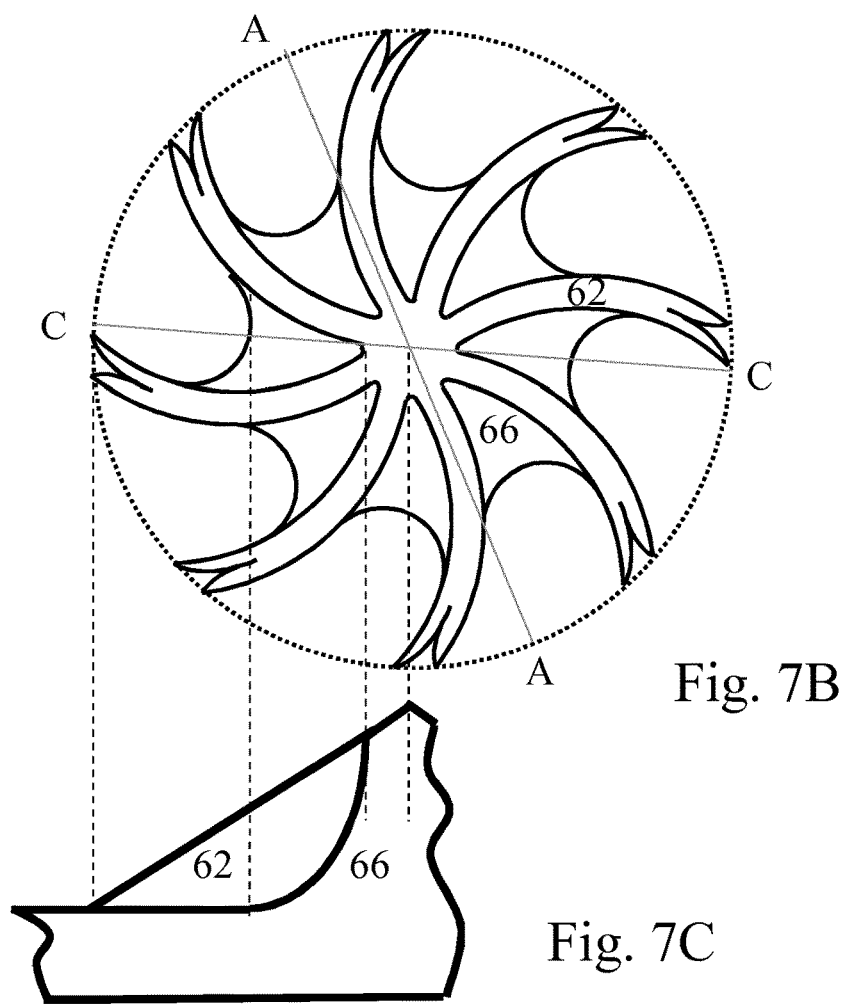
Fig. 7B
Fig. 7C

POPPET VALVE AND METHOD OF ITS MANUFACTURE

BACKGROUND

1. Technical Field

The present invention relates to poppet valves and more specifically to a poppet valve that is manufactured by a method that includes injection molding of a mixture of a metal powder and a binder.

2. Related Art

Conventional poppet valves are manufactured by molding of molten metal, forging or by machining e.g. on a lathe.

It is therefore desirable to have an alternative manufacturing method that does not require machining and thus avoids the loss of material by machining. Powder metallurgy forms the base of the present invention, to avoid any loss of material especially of metal.

EP 1925682 A1 discloses a method for producing parts of hollow valves, wherein a metal powder is formed into a specific shape using injection molding and subsequently sintered. EP 1482156 A2 discloses a powder metal component suited for use as a valve guide, the component is produced using sintering.

SUMMARY

The method for manufacturing a poppet valve or mushroom valve according to the present invention, comprises providing a mixture of metal powder and a binder, filling and pressing said mixture in a mold, to obtain a green product, removing the binder from said green product, and thermally sintering said green product to a poppet valve blank by hot isostatic pressing. The binder is used to ease the filling of the mold with the metal powder. The binder is removed from the green product to enable the hot isostatic pressing to remove all voids from the poppet valve blank and to prevent that binder particles weaken the metal structures of the poppet valve blank.

In one example embodiment of the present method said filling and pressing said mixture in a mold, to obtain a green product, is performed by injection molding said mixture into an injection mold. Especially the presence of the binder may enable a liquidification of the mixture sufficiently to enable a use in connection with injection molding equipment. Injection molding is a technology sufficiently known and widely used to enable a fast and reliable production of poppet valve green products. That is, the binder enables a new and fast method of manufacturing poppet valve green products. Sintering and other power metallurgy based technologies have not yet been considered for the use in manufacturing poppet valves, especially as the metal structures of sintered metal have not been considered as suitable for high temperature and high stress applications such as hollow poppet valves.

In another example embodiment of the method, said green product is removed from said injection mold prior to said removing of said binder from said green product. This enables the use of different debinding methods including especially chemical debinding.

In an embodiment of the present invention said green product is subjected to chemical debinding, wherein said binder is removed or dissolved by placing said valve green product in a chemical solution and dissolving the binder a chemical reaction and removing it through voids in said valve green product.

In yet another additional embodiment said binder is removed from said green product by thermal debinding, i.e. the green product is heated to thermally destroy the chemical structure of the binder or to vaporize the binder to again remove it via voids in the green product. The removal of the binder is crucial as, any remaining binder material would cause a disturbed and weakened metal structure in the poppet valve blank. In this embodiment the binder is removed by vaporization or by pyrolysis.

In an additional embodiment of the present invention said binder comprises or consists of plastic material. Plastic material combine two important features required for the method of the present invention, a high liquidation capability and the possibility to vaporize or use pyrolysis for the debinding step.

By another embodiment of the method said metal powder is selected from or comprises Ti Al V 64, Ti Al Sn Zr Mo 6245 (DIN 3.7145), Nomonic 80A, 21-4-3 (DIN 1.4882), 21-4-N (DIN 1.4871), 3015, 25-15, P25, or a basic material form conventionally manufactured valves. It is also possible to use mixtures of these materials to manufacture a poppet valve green product, blank. It is also possible to add additives such as ceramics or ceramic particles to the metal powder to modify the mechanical properties of the metal product.

Another embodiment of the method further comprises at least one surface treating step of said poppet valve blank, to obtain a poppet valve and or a surface treatment of said poppet valve. The surface treatment may comprise a machining, grinding rolling. The surface treatment may further comprising a nitridating or coating of a surface or a part of a surface of said poppet valve blank and/or said poppet valve, respectively.

Another exemplary embodiment of the method for manufacturing a poppet involves a green product and/or said poppet valve blank being manufactured as half shell valves. The green product poppet valve half shell green products may be connected to a rotational symmetric poppet valve green product or blank by applying a hot isostatic pressing of two half shell valve green products. It is also possible to use hot isostatic pressing of poppet valve half shell green products to obtain hollow poppet valve blanks and to weld tow of said hollow poppet valve blanks together to obtain a hollow poppet valve blank. It is also possible to include sodium into a cavity of said hollow poppet valve blanks prior to welding to obtain an internally cooled hollow poppet valve blank having a sodium filling.

Just another example embodiment of the method uses a green product manufactured as hollow shaft and/or hollow head valve green product. In this embodiment said poppet valve blank is manufactured as a hollow shaft and/or hollow head valve blank having an axial opening at the valve head. This may be manufactured using a core extending from the poppet head in a direction to an end of the shaft of the valve. This core may be placed inside the poppet valve green product during hot isostatic pressing, and may be removed after said hot isostatic pressing. This embodiment further comprises closing said opening with a disc and welding said disc to said valve blank, to obtain a hollow poppet valve. It is also possible to fill said hollow space with sodium to obtain an internally cooled poppet valve.

Another example embodiment of the present invention performs said step of injection molding performed by coextruding two different metal mixtures to obtain a poppet valve green product and/or a poppet valve having different material compositions at the valve shaft and the valve head. This may contribute to improved lifetime of the poppet valve. It is also possible to extrude said two mixtures from two different sides, e.g. for a shaft end side of said poppet valve and from a valve head side of said poppet valve to obtain an mixed material poppet valve green product.

An additional exemplary embodiment of the method further comprises at least one step of rolling the surface of the valve blank or the valve to increase the surface condition. This may contribute to increase the surface characteristics of the valve or the valve blank and may also significantly decrease the porosity of the valve blank or the valve.

One other example embodiment of the present invention also uses a core in said mold that is at least partially made of said binder material. The core is inserted in said mold prior to filling said mold. The core may be injection molded from said binder material. It is also possible to use a composite material such as fibre-reinforced plastic material to increase the durability of the core. The core is at least partially configured as lost core, as its material is removed from the green product during the debinding step. That is the core is removed chemically or by pyrolysis.

In another example embodiment the above core in turn comprises an inner core made e.g. of metal. The inner core is reusable, and may be removed from the green product after removing the part of the core made of binder material. This inner core reduces the amount of binder material wasted during each casting process. The inner core also has another important advantage, i.e. it may be made of a very robust material, to avoid the use of chaplets (core supports) in the mold. This is especially useful, as the cavity in the poppet valve especially in case of hollow head poppet valves comprises a very adverse shape from a solidity's point of view. The mushroom shaped core that is cantilevered at the end of the long thin shaft provides problems with respect to the exact position of the head cavity in the hollow head poppet valve mold.

According to another aspect of the present invention, a green product manufactured according to one of the above methods is provided.

According to another aspect of the present invention, a poppet valve blank, obtained from the above green product and manufactured according to one of the above methods is provided.

According to another aspect of the present invention, a poppet valve, obtained from the above poppet valve blank and manufactured according to one of the above methods is provided According to another aspect of the present invention, an internal combustion engine comprising the above poppet valve is provided.

THE DRAWINGS

In the following the present invention is shown in the figures in different non-limiting exemplary embodiments.

FIGS. 2A and 2B show a first possibility of manufacturing of an internally cooled poppet valve according to the present invention.

FIGS. 4A to 4G show another possibility of manufacturing of an internally cooled poppet valve according to the present invention.

FIG. 5 shows an embodiment of a green product or poppet valve blank.

FIG. 6 is another embodiment of a green product or poppet valve blank.

FIG. 7A is a fragmentary view of a poppet valve head provided with coolant guiding blades taken along lines A-A of FIG. 7B.

FIG. 7B is a plan view of the poppet valve of FIG. 7A.

FIG. 7C is a further fragmentary view taken along lines C-C of FIG. 7B.

DETAILED DESCRIPTION

In the following the present invention is described by means of non-scale schematic embodiments visualizing the principle of the present invention.

Figure 1A:
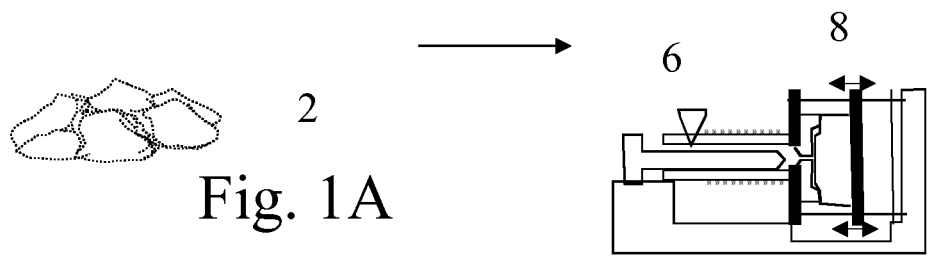
FIGS. 1A to 1E show different steps of the manufacturing of a poppet valve according to the present invention.

FIG. 1A shows at least one metal powder or a combination of at least two metal powders 2 that serve as one base material of the present invention. FIG. 1A also shows a binder 4 or binder powder that is based on a plastic material and that is to be mixed with said one or more metal powders 2. The metal powder is mixed with said binder to obtain a powder base material mixture.

Figure 1B:

In FIG. 1B it is shown that the metal powder is fed to an injection molding machine 8 to fill a mold 10. Due to the presence of the binder the injection molding machine may process the metal powder. Similar to fiber-reinforced plastic material, it would not be possible to use the metal powder alone in an injection molding process. During the injection molding process the plastic binder may be liquefied and in turns help to liquefy the powder mixture. The injection molding process yields a green product, that comprises the metal powder and the binder material.

Figure 1C:
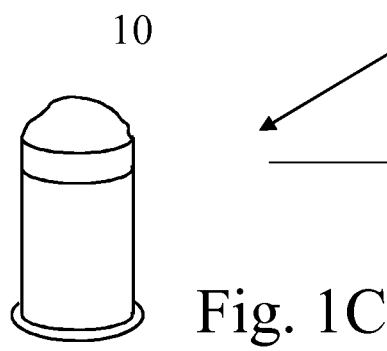

FIG. 1C shows an optional step of chemically removing the binder from the green product. This may be performed using a chemical solvent for said binder material. It is also possible, depending on the material of the binder to chemically destroy the molecules of the binder material to remove it from the green product.

Figure 1D:
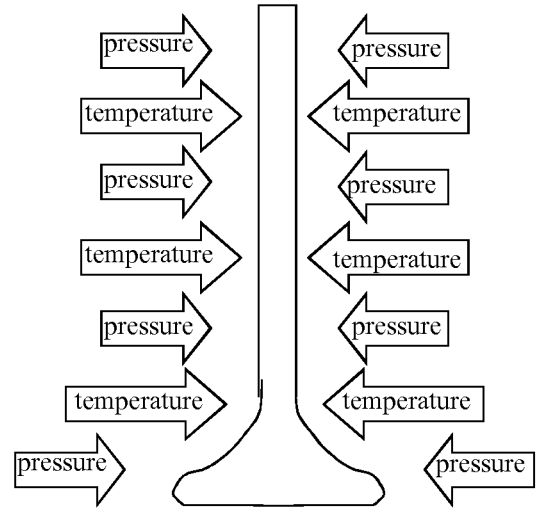

FIG. 1D shows a step of thermal debinding followed by hot isostatic pressing to achieve a sinter connection between the metal particles of the green product. Due to the combination of the isostatic pressing and high temperature. the plastic binder material is removed by pyrolysis, i.e. thermally decomposing the molecules of the binder material, as far as still present after the optional chemical debinding. During a next phase of thermal and pressure treatment the porosity of the green product is reduced, and the volume of the green product is reduced, during the sintering process.

Figure 1E:
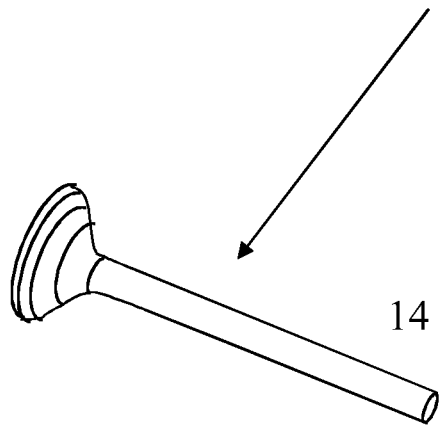

FIG. 1E shows a valve blank 14 obtained after the hot isostatic pressure sintering process of FIG. 1D. Due to still present pores in the valve blank, additional processing steps such as rolling, metal injection, machining or surface coating or a combination thereof may be performed on the valve blank.

FIGS. 2A and 2B show a first possibility of manufacturing of an internally cooled poppet valve according to the present invention. In FIG. 2A the valve blank 14 has been manufactured as a hollow shaft and hollow head valve blank. This may be achieved by using an injection mold having a core that runs from the head 24 of the valve in a direction to the end of the shaft 18. In the shaft 18 and within the head 24 the cavity 20 is formed. The cavity 20 opens axially through the valve head. The end of the shaft is provided with a keepers engagement structure 36 to enable the valve to be used with a conventional internal combustion engine.

FIG. 2B shows an internally cooled valve 16 after the cavity 20 has been partially been filled with sodium 22 and the opening in the valve head 24 has been closed with valve head plug 26. The valve head plug 26 has been connected to the valve head 24 by welding.

Figure 3A:
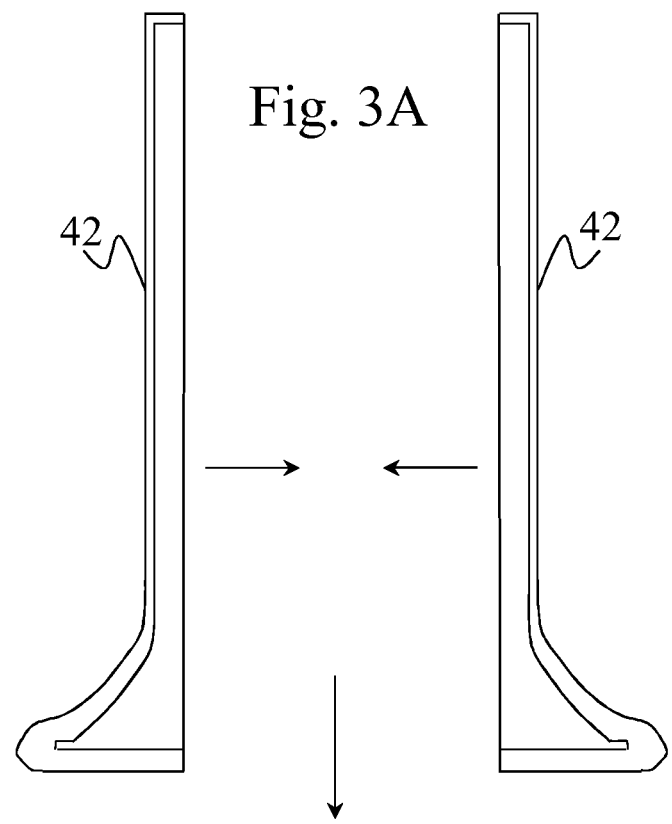
FIGS. 3A and 3B show another possibility of manufacturing of an internally cooled poppet valve according to the present invention.
Figure 3B:
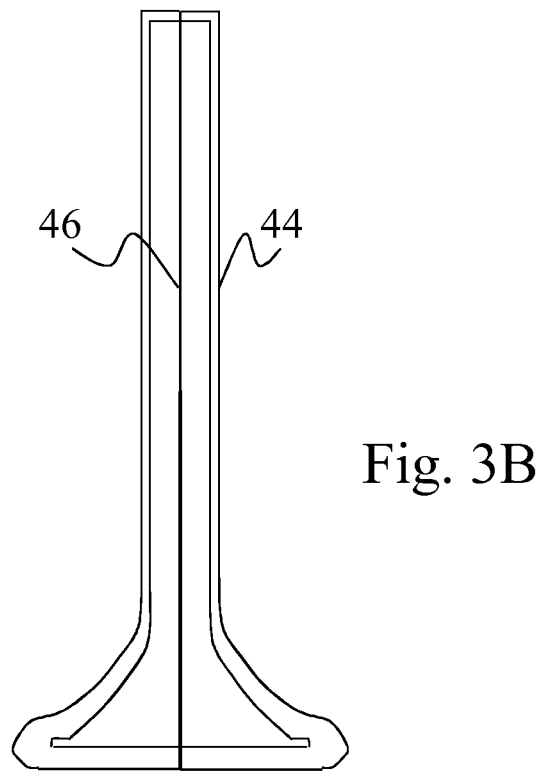

FIGS. 3A and 3B show another possibility of manufacturing of an internally cooled poppet valve according to the present invention. FIG. 3A shows two hollow valve shell blank 42 manufactured according to the present invention, with the method as described above. Instead of manufacturing poppet valve blanks as described in FIGS. 1A to 1E, hollow valve shell blanks have been produced with the same method. In FIG. 3A it is indicated to join tow of said hollow valve shell blank 24.

In FIG. 3B the two hollow valve shell blanks have been joined to a hollow valve blank 44, wherein the two hollow valve shell blanks have been connected by a welding seam 46. Preferably the blanks are filled with sodium in a later process step.

FIGS. 4A to 4G show another possibility of manufacturing of an internally cooled poppet valve according to the present invention.

FIG. 4A shows a core 50 made of binder material 4. As the core is made of binder material it will be removed or dissolved during the debinding step of the green product. That is the material of the core may be removed from the green product without exerting a significant mechanical load onto the green product. The core is configured as lost core, as it will become dissolved or destroyed during the debinding process. The lost core may be produced by injection molding, enabling the production of a stable and compact core. However it is also possible to also include an optional reusable inner core 48 inside said lost core 50, to increase the strength of the core. It is possible to use e.g. a steel rod as inner core 48. Advantageously the inner core may be covered by binder material, to ensure that the inner core may be removed from the green product without even getting in contact with the green product so that any possibility of damaging the green product, as the removed binder material leaves enough clearance to ensure that removing the inner core will not damage the debinded green product.

FIG. 4B shows one exemplary way to injection mold the green product in an injection mold 54. The core 50 or the inner core 48 are held by a core holder that is part of the injection mold. It is possible to use different molds. The powder mixture 5 is injected into a cavity of the injection mold 54 at at least one location. It is also possible to use different mixtures at the head portion and at the shaft portion of the poppet valve to obtain a composite valve green product, having e.g. a more temperature resistant material in the area of the head and a less temperature resistant material in an area of the upper shaft. It is also envisioned to use a more temperature-resistant material mixture at the area of the valve head and a more weldable material at an area of the shaft end, to ease the connection of a valve end.

FIG. 4C shows the non-debinded green product with the inner core still in the cavity of the green product. This is a configuration in which the green product leaves the injection molding machine.

FIG. 4D shows the green product 10/14 after the debinding step. The optional inner core 48 is removed upwards without even coming into contact with the inner surface of the cavity.

In FIG. 4E the debinded green product is subjected to pressure and temperature during a hot isostatic pressing, to achieve a sintering of the metal particles. During the sintering of the green product the metal particles of the green product form an intermetallic compound to achieve the mechanical properties necessary for a use as poppet valve in an internal combustion engine. The possibility to use different injectors enables the production of valves having different metallic compositions e.g. along an axial direction of the sintered valve. It is also possible to coat the sintered valve.

FIG. 4F shows the cavity partially filled with an internal coolant 22 such as sodium.

FIG. 4G shows that the cavity 20 has been closed by a poppet valve end 56 that has been welded onto the end of the shaft. The poppet valve end is also provided with structures to enable the engagement of valve collets. Only a part of the valve is filled with sodium to enable a shaker cooling of the internally cooled poppet valve. It is also possible to coat the valve partially to further improve the thermal and mechanical properties of the poppet valve.

FIG. 5 shows a green product or poppet valve blank for an internally cooled poppet valve, that basically has the same shape as the ones depicted in FIG. 4E or 4F. The shaft is made as hollow valve shaft 18 and surrounds a cavity 20 that extends down to the valve head. On the bottom of the valve head there is provided a coolant guiding cone 66 to direct coolant flowing down the hollow shaft into a direction to the outer rim of the valve head. The coolant guiding cone 66 is also provided with coolant guiding blades 62 to cause a rotation of the coolant around a longitudinal axis of the hollow poppet valve shaft 18. It is expected that the coolant circulating in the valve head achieves an increased heat transfer from the valve head to the circulating coolant. Additionally the impact of coolant moving down the hollow shaft is also significantly reduced, as its flow direction is smoothly diverted to the outer rim of the poppet valve head. That is with the help of the coolant guiding cone the mechanical stress caused by coolant moving in the cavity 20 may be significantly reduced. The coolant guiding blades 62 are bend in clockwise or counter-clockwise direction to direct the coolant flow. The coolant guiding blades may be produced by providing respective grooves in a core according to FIGS. 4A to 4C, to achieve FIG. 6 shows a green product or poppet valve blank for an internally cooled poppet valve. In the hollow poppet valve shaft 18 a helical guide blade 64 is arranged to cause a circular or helical flow in a coolant flowing down the hollow shaft 18 towards the poppet valve head. The interrupted lines on the bottom of the cavity 20 indicate an optional coolant guiding cone 66 and an optional coolant guiding blades 60.

FIG. 7A shows a sectional partial view of a poppet valve head provided with coolant guiding blades 62. Above the coolant guiding blades 62 a cavity 20 for a coolant is arranged. As seen from above, the coolant guiding blades 62 are bend in a counter clockwise direction when seen from above. The area 62 may be considered as a backside of a coolant guiding blades 62, while the area 66 shows a section right through a coolant guiding blade. The area 66 is usually also occupied by a coolant guiding cone 66.

FIG. 7B shows an upper view onto the coolant guiding cone 66 and the coolant guiding blades of FIG. 7A. The coolant guiding cone 66 only occupies the area between the coolant guiding blades 62. The line A-A indicates the direction of the section through the cone and the blades as depicted in FIG. 7A.

FIG. 7C shows a section along line B-B through the coolant guiding cone 66 and the coolant guiding blade 62 of FIG. 7B. In this section the shape of the cone is clearly visible. The coolant guiding blade 62 is not sectioned. With FIGS. 7A to 7C the shape of the coolant guiding cone 66 and the coolant guiding blades 62 should be clear enough.

It is also possible to further include machining steps in the manufaction process, to obtain desired tolerances and surface structures of the sintered product or the poppet valve.

The claims define the scope. The figures only show exemplary non-limiting embodiments to ease the understanding of the principles of the present invention.

The invention claimed is:

1. A method for manufacturing a poppet valve or mushroom valve, comprising:
    providing a mixture of metal powder and a binder,
    filling and pressing the mixture in a mold, to obtain two green products; wherein each of the discrete green products is in the form of a half shell valve having a hollow head portion and a hollow stem portion and a longitudinally extending joining surface; and wherein the two green half shell valves are joinable to one another along their respective longitudinal joining surfaces;
    removing the binder from the green products;
    matching the two half shell valves of the green product along their longitudinal joining surfaces either before or after removal of the binder and thereafter joining them to one another by thermally sintering the green products by subjecting the joined half shells hot isostatic pressing to obtain a hollow poppet valve blank.

2. The method for manufacturing a poppet valve according to claim 1, wherein the filling and pressing of the mixture in a mold to obtain the green products is performed by injection molding the mixture into an injection mold.

3. The method for manufacturing a poppet valve according to claim 2, wherein the green products are each removed from the injection mold prior to removing the binder from the green product.

4. The method for manufacturing a poppet valve according to claim 3, wherein the binder is removed from the green product by chemical debinding.

5. The method for manufacturing a poppet valve according to claim 3, wherein the binder is removed form said green product by thermal debinding.

6. The method for manufacturing a poppet valve according to claim 1 wherein the binder comprises plastic material.

7. The method for manufacturing a poppet valve according to claim 1, wherein the metal powder comprises Ti Al V 64, Ti Al Sn Zr Mo 6245 (DIN 3.7145).

8. The method for manufacturing a poppet valve according to claim 1, wherein the metal powder comprises additives selected from ceramics.

9. The method for manufacturing a poppet valve according to claim 1 further comprising the step of surface treating the poppet valve blank.

10. The method for manufacturing a poppet valve according to claim 9, wherein the surface treating further comprises a nitriding or coating of a surface or a part of a surface of the poppet valve blank and/or the poppet valve.

11. The method for manufacturing a poppet valve according to claim 1, wherein at least two green products are manufactured as half shell valves, and a third green product is manufactured in the shape of a poppet valve and, wherein said poppet valve green product is placed between two half shell green products and these three green products are connected by hot isostatic pressing to obtain a hollow poppet valve blank.

12. The method for manufacturing a poppet valve according to claim 1, wherein the step of injection molding is performed by coextruding two different metal mixtures to obtain a poppet valve green product and/or a poppet valve having different material compositions at the valve shaft and the valve head.

13. The method for manufacturing a poppet valve according to claim 1, further comprising a step of rolling the surface of the valve blank or the valve.

14. The method for manufacturing a poppet valve according to claim 1, further comprising providing a core at least partially made of the binder in the mold prior to filling the mold.

15. The method according to claim 14, wherein the core is configured as a lost core that is further provided with a reusable inner core.

16. The method according to claim 14, wherein the core is provided with recesses, so that guide blades are formed in a hollow valve head and/or a hollow valve shaft of the green product and/or the valve.

* * * * *